May 19, 1925.

S. S. AMDURSKY 1,538,606

REGULATING APPARATUS

Filed July 7, 1923  2 Sheets-Sheet 1

INVENTOR.
Samuel S. Amdursky
BY
his ATTORNEY

May 19, 1925.

S. S. AMDURSKY 1,538,606

REGULATING APPARATUS

Filed July 7, 1923    2 Sheets-Sheet 2

INVENTOR.
Samuel S. Amdursky
BY Frederick F. Church
his ATTORNEY

Patented May 19, 1925.

1,538,606

UNITED STATES PATENT OFFICE.

SAMUEL S. AMDURSKY, OF ROCHESTER, NEW YORK, ASSIGNOR TO TAYLOR INSTRUMENT COMPANIES, OF ROCHESTER, NEW YORK, A CORPORATION OF NEW YORK.

REGULATING APPARATUS.

Application filed July 7, 1923. Serial No. 650,121.

*To all whom it may concern:*

Be it known that I, SAMUEL S. AMDURSKY, a citizen of the United States, residing at Rochester, in the county of Monroe and State of New York, have invented certain new and useful Improvements in Regulating Apparatus; and I do hereby declare the following to be a full, clear, and exact description of the same, reference being had to the accompanying drawings, forming a part of this specification, and to the reference numerals thereon.

This invention relates to regulating apparatus of the variety adapted for regulating the temperature of a container or other body by supplying heating or cooling medium thereto in variable quantities, one object of the invention being to provide a practical and efficient apparatus of this character capable of regulating the temperature of a body, as for example a vulcanizer, in such a manner as to produce a uniform heating of all parts thereof at any given time. More specifically stated, it is an object of the invention to provide an improved apparatus of the character specified adapted to control the temperature within a vulcanizer by the supply of a heating medium, such as steam, delivered to the vulcanizer in such a manner and in quantities so regulated as to insure uniform or equal heating of all portions thereof at a predetermined fixed temperature or through a range of different temperatures over a given period in accordance with a predetermined process.

To these and other ends the invention resides in certain improvements and combinations of parts all as will be hereinafter more fully described, the novel features being pointed out in the claims at the end of the specification.

In the drawings:—

Similar reference numerals throughout the several views indicate the same parts.

Figure 1:
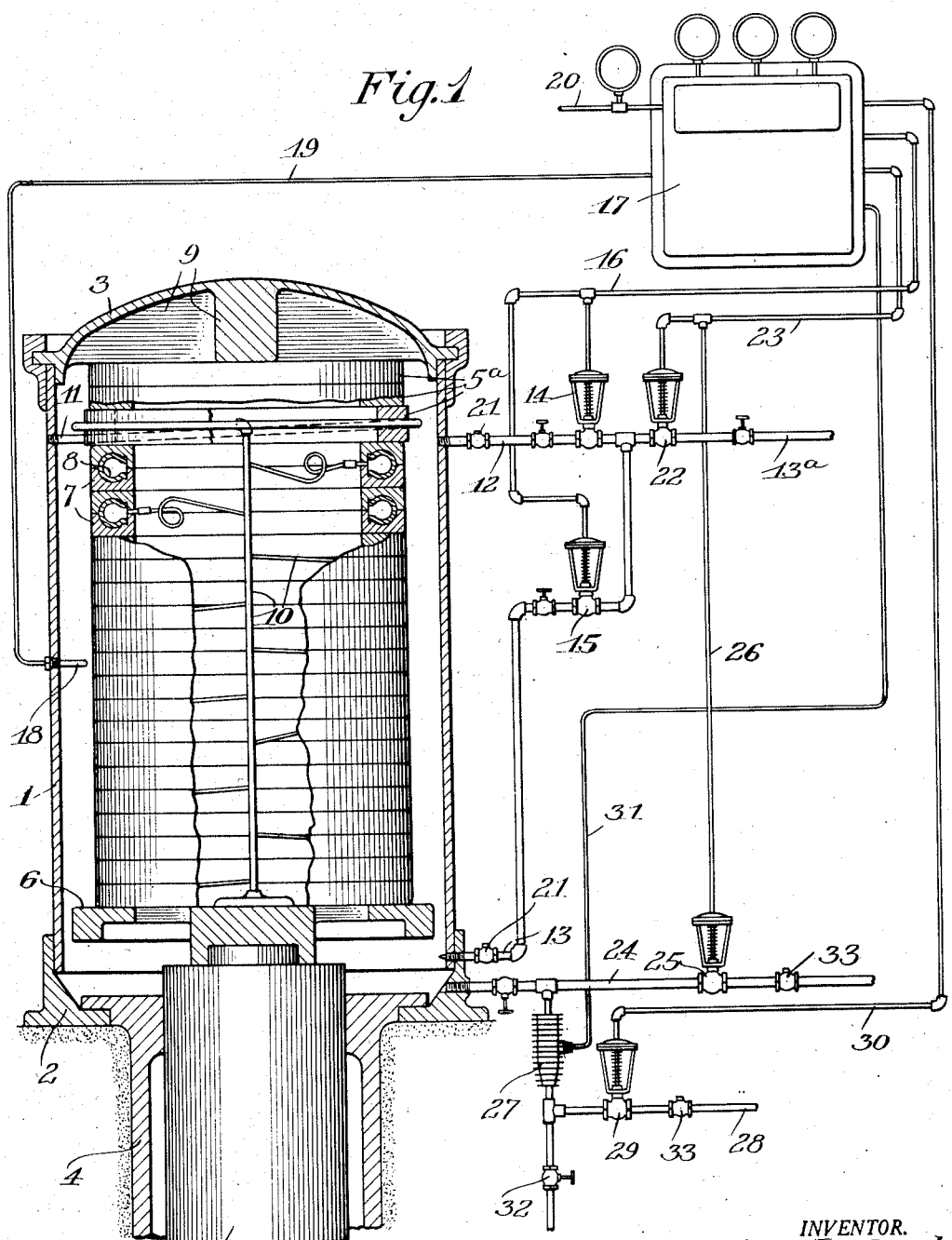
Figure 1 is a sectional elevation of a vulcanizer with its operating connections embodying the present invention.

The drawing illustrates a preferred embodiment in which the invention is applied to the regulation of temperature in a vulcanizer such as commonly employed for processing rubber tires for vehicle wheels. The vulcanizer is shown as comprising a substantially cylindrical container or shell 1, supported on a base 2 and having a removable top or cover 3. The base portion comprises a hydraulic cylinder 4 in which moves a plunger 5 carrying on its upper end in the bottom portion of the shell a platen or table 6 on which the moulds 7 for the tires 8 are stacked one upon another as shown. Platen 6 is of a perforate character and in the present instance in the form of a spider having openings therethrough affording communication between the interior of the mould stack and the space below and around the same. The cover 3 includes webbed portions 9 forming an abutment or upper platen between which or one or more annular spacer rings 5* and the platen 6 the moulds are compressed by the upward movement of the hydraulic plunger 5, as well understood in the art. At 10 is a branching pipe system connected with the individual moulds for admitting air thereto under pressure in accordance with a common practice, this system being supplied with air under pressure through a connection 11 extending through the side of the vulcanizer shell. With the apparatus so arranged, pressure is applied to the moulds between the platens by the elevation of the hydraulically operated plunger 5 and the vulcanizer shell is supplied with steam to heat the same, in accordance with a predetermined process, by the means hereafter described.

A common difficulty in such apparatus is that different portions of the shell and of the moulds themselves are heated to temperatures different in the different portions at any given time, with the result of irregular and imperfect vulcanizing effects and consequent wastage of material. This is particularly true in apparatus in which compressed air is supplied to the moulds as described, because of the difficulty of preventing more or less leakage of the air which tends to cool the regions of leakage. This difficulty has been overcome by the present invention by supplying and regulating the supply of heating medium in such a way as to maintain an effective circulation of the medium throughout the vulcanizer shell so that all portions of the shell and moulds are heated equally and uniformly, however the temperature of the whole may be varied during the process period.

To accomplish the desirable result indicated above the steam or other heating medium is supplied to the shell through two conduits 12 and 13, the former communicating with the interior of the shell preferably adjacent its top and the latter adjacent its bottom below platen 6. These conduits in the present instance branch from the common supply line 13ª leading to a suitable source of supply. Conduit 12 however is used for supplying steam at a relatively low velocity, depending of course upon the pressure, while conduit 13 is either smaller in size than the delivery orifice of conduit 12 or else has its own delivery orifice reduced in area so that it discharges the steam into the shell at a high velocity relative to that of the steam delivered through conduit 12. The steam thus supplied through conduit 13 is preferably discharged as shown transversely of the shell below and adjacent platen 6. This high velocity jet of steam tends to agitate and circulate the steam and gases within the vulcanizer not only in the annular space between the shell wall and the stack of moulds but also throughout the interior of the latter through the opening or perforations in the platen 6. Such circulation mixes the steam and air and thus brings the entire contents of the shell to a common temperature. This effect is increased by employing a perforate or spider like upper platen as shown to afford communication to the upper end of the mould stack also and in addition, if so desired, the adjacent individual moulds may be slightly separated from each other by spacing strips to afford circulation between the inside of the mould stack and the annular space about the same, although this latter arrangement has not been found necessary in practice.

The supply lines 12 and 13 are individually controlled by means comprising in the present instance automatic pressure operated valves 14 and 15 respectively of the so called diaphragm type. The diaphragm chambers of these valves are connected as shown with a common pipe 16 leading to a regulating device indicated generally at 17. The latter comprises sensitive means responsive to the temperature within the container shell in the form of a bulb 18 inserted through the shell wall as shown and connected by a capillary tube 19 with a movable diaphragm for actuating an auxiliary valve controlling the connection between the pressure line 16 and a line 20 leading to a suitable source of pressure. The regulating device 17 may have any suitable known construction, such for example as that shown and described in the pending application of Harry Y. Norwood, Serial #521,222, filed Dec. 9, 1921 for time controlled regulating apparatus, a description of which appears hereafter. By means of this regulating device the pressure in line 16 is varied automatically in accordance with the temperature within the vulcanizer, for operating the control means or valves 14 and 15. The latter in the present instance are so adjusted that valve 14 shuts off the supply of steam to conduit 12 when the temperature in the vulcanizer has been raised and approaches the degree of heat at which the process is accomplished. The supply of steam at high velocity through conduit 13, however is continued until the desired processing temperature is attained and for maintaining the latter while also producing the desired circulation. Should the temperature tend to become excessive, valve 15 also is automatically closed until the temperature falls, through radiation losses and the like, when valve 15 is again open to maintain the desired temperature and circulation. Should the decrease in temperature be excessive, valve 14 also is eventually opened but it is to be understood that when the vulcanizer has been brought up to the processing temperature range, the steam is preferably supplied exclusively at high velocity through conduit 13 so far as possible for maintaining the circulation. Conduits 12 and 13 may be provided with check valves 21. It is to be understood also that the regulating device 17 may be of a character operating to maintain a fixed temperature in the vulcanizer during the process or may comprise time mechanism for varying the temperature at which the vulcanizer is maintained during the processing period, as well understood in the art.

Preferably the regulating device 17 comprises timing mechanism for automatically terminating the process after a given period, as described in said pending application, and in such case a pressure operated valve 22 is included in the common steam supply line 13ᵃ with an operating pressure connection 23 leading to the regulating device. The vulcanizer is also equipped with a discharge conduit 24 communicating with its bottom and controlled by a pressure operated valve 25 connected by a line 26 with the line 23, these valves 22 and 25 being arranged so that a given pressure condition in line 23 operates to open one and close the other. Thus valve 22 is normally open and 25 closed until the end of the process when these positions are reversed to cut off all steam from the vulcanizer and discharge the contents thereof. At 27 is a condensation chamber or trap connected with the discharge line 24 and itself discharging through a line 28 controlled by a pressure operated valve 29 connected by line 30 with the regulating device. The latter has also a capillary tube connection 31 with a bulb located in trap 27 and controlling the operation of valve 29, in conjunction with the retiming mechanism if desired, to discharge the trap, as well understood in the art. At 32 is a hand valve for emptying trap, and the discharge line 28 of the latter may be provided with a check valve 33 as is also the discharge conduit 24.

Figure 2:
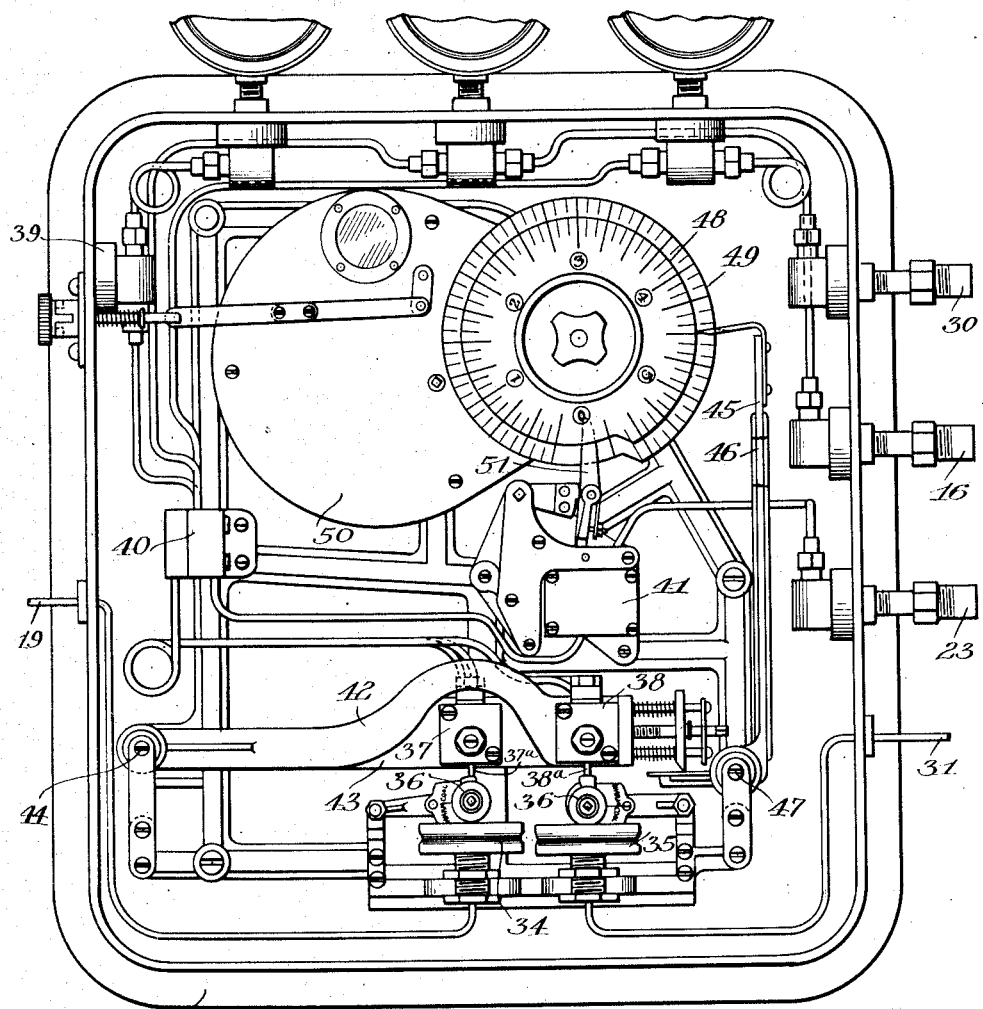
Figure 2 is an enlarged front elevation of a regulating or controlling mechanism for the same, with a portion of the casing removed to more clearly show the mechanism.

The preferred form of regulating device is illustrated in detail in Figure 2, comprising a pair of thermostatic capsular diaphragms 34 and 35 connected with the capillaries 19 and 31, respectively, leading to the vulcanizer and trap 27. These diaphragms, through interposed adjusting devices 36, operate the stems of secondary air valves 37 and 38, respectively, controlling the supply of air from the line 20 connected through the casing wall at 39 and through a manifold 40 to the air lines 16 and 30 for operating the main automatic valves 14, 15 and 29. The secondary air valve 41 controls the supply of air from pipe 20 to the line 23 leading to the main automatic valves 22 and 25. Valves 37 and 38 may be of any suitable construction such as described, for example, in said application Serial No. 521,-222, being carried upon a pair of levers 42 and 43, respectively, pivoted at 44 on the casing and supported at their opposite ends on the arms of a pair of bell crank levers 45 and 46, respectively, pivoted at 47. The other or upright arms of the bell crank levers bear upon the peripheries of a pair of cams 48 and 49, respectively, rotated by a clock mechanism 50. Valve 41 may be of any suitable construction such as described, for example, in said application Serial No. 521,222. This valve, however, is stationarily located on the casing and operated by a pivoted arm 51 adapted to be tripped by an abutment (not shown) rotating in association with cams 48 and 49 as more fully described in the said application No. 521,222. As stated, the casings and seats of secondary valves 37 and 38 are carried on levers 42 and 43 which are swung through the action of the connected bell crank levers and cams 48 and 49 to move the valve seats toward or from diaphragms 34 and 35 depending upon the desired temperature curve and the corresponding shape of cams 48 and 49. It is apparent that these secondary valves are conjointly controlled by the action of the diaphragms on their valve stems tending to unseat the valves and also by the proximity of the valve seats to the diaphragms controlled by the time driven cams so that either uniform or variable operation of the vulcanizer may be effected as controlled by the profiles of the cams. At the end of the period of operation the arm 51 of secondary valve 41 is tripped to operate this valve which in turn operates the valves 22 and 25 to terminate the process as described. It is to be understood that valves 22 and 25 are thus operated in reverse sense to close one and open the other by the same air pressure condition in their common supply line 23 and this is accomplished by arranging the operating diaphragms of valves 22 and 25 for moving the valve stems in opposite directions, or by locating the valve bodies on opposite sides of their seats in valves 22 and 25 so that operation of the valve stems in the same direction opens one and closes the other and vice versa, as well understood in the art.

Figure 3:
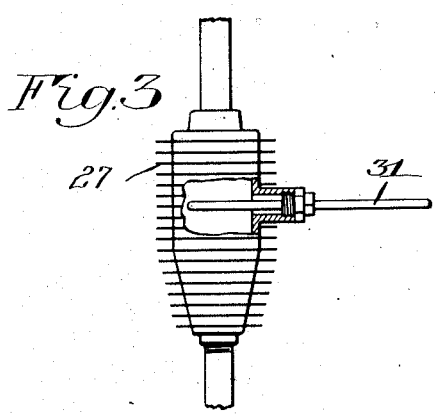
Figure 3 is an enlarged view of a condensation trap for the vulcanizer with a portion thereof in section to illustrate the connection therewith of a thermostatic element.

As shown in Figure 3, the condensation trap is merely a container provided with heat radiating flanges and the thermostatic element for the controlling device 17 is connected with the trap so as to be subjected to the temperature of steam supplied thereto or to the condensation collected therein for closing or opening the trap discharge, as well understood in the art.

The operation of the apparatus has already been explained in connection with the description of its construction and may therefore be briefly summarized as follows: With the moulds suitably arranged under pressure in the vulcanizer and with steam supplied through line 13ᵃ, control valves 14 and 15 are maintained open and steam is rapidly supplied to the vulcanizer to raise its temperature while being maintained in circulation therein by the high velocity discharge supply through conduit 13. The temperature of all portions of the vulcanizer interior is thus uniformly and rapidly raised until it reaches a predetermined degree acting through the sensitive means or bulb 18 to close valve 14. Valve 15 however, continues open as long as additional steam is required to maintain the temperature, or raise the same, thereby maintaining the circulation. Eventually the process is terminated by the closing of the common control valve 22 and the opening of valve 25. While the successful results accomplished by the present invention are believed to be due primarily to the provision of the high velocity jet for circulating the steam within and around the mould stack, and while this jet may be located adjacent either the top or bottom of the container, the desired results are believed to be due also in part to arrangement of the circulation producing jet adjacent the bottom rather than the top of the vulcanizer shell as this accomplishes better circulation and more uniform heating than where such jet is located adjacent the top of the shell. The preferred arrangement has the further advantage of enabling permanent simple and economical conduit connections with the shell to be made as shown, thus avoiding the various difficulties encountered in connecting conduits through the removable top or cover.

I claim as my invention:

1. In a temperature regulating apparatus, the combination with a body to be heated, of a plurality of conduits for heating medium communicating therewith, pressure operated means, one for each of said conduits, for controlling the flow of heating medium therein arranged for operation respectively, by different pressures, means connected with said body and responsive to temperature conditions therein, and a device actuated by said responsive means arranged for connection with a source of pressure and connected with each of said controlling means for operating the latter individually.

2. In a temperature regulating apparatus, the combination with a container to be heated, of a plurality of pipe lines communicating with said container and adapted for connection with a source of heating medium, a pressure operated valve for each of said pipe lines, said valves being arranged for operation respectively, by different pressures, sensitive means extending into said container and responsive to the temperature therein to be regulated, and a single regulating device actuated by said sensitive means adapted for connection with a source of pressure and connected with each of said valves for operating the latter individually.

3. In a temperature regulating apparatus, the combination with a body to be heated, of a plurality of conduits for supplying heating medium thereto, a discharge conduit for said body, a pressure operated control means for each of said supply conduits arranged for operation, respectively, by different pressures, a common pressure operated control means for all of said supply conduits, a pressure operated control means for said discharge conduit, sensitive means connected with said body and responsive to the temperature thereof, and regulating means actuated by said sensitive means and adapted for connection with a source of fluid pressure and with each of said control means for operating the latter.

4. In a temperature regulating apparatus, the combination with a container to be heated, of a pair of conduits for supplying heating medium thereto, one of said conduits having a relatively small delivery orifice for supplying said medium at a relatively high velocity for inducing temperature equalizing circulation in said container, a pressure operated control valve for each of said conduits, said valve being adapted for operation by different pressures respectively for supplying heating medium through said high velocity conduit exclusively at a predetermined high temperature in said container, sensitive means connected with said container and responsive to the temperature therein, and a regulating device adapted for connection with a source of pressure and connected with said sensitive means for actuation thereby and with said control valves for operating the latter individually.

5. In a temperature regulating apparatus, the combination with a vulcanizer comprising a container and a perforate platen therein, of a conduit for supplying heating medium to said shell arranged to discharge the same transversely thereof between the end of said shell and said platen, pressure operated control means for said conduit, sensitive means connected with said shell and responsive to the temperature therein, and a regulating device adapted for connection with a source of pressure and connected with said sensitive means for actuation thereby and with said control means for operating the latter to regulate the temperature of said vulcanizer.

6. In a temperature regulating apparatus, the combination with a vulcanizer comprising a container and a perforate platen therein, of a pair of conduits for supplying heating medium to said shell one being arranged for discharging said medium at a relatively high velocity transversely of said shell between the end of the latter and said platen, a pressure operated control means for each of said conduits, sensitive means connected with and responsive to the temperature in said shell and a regulating device adapted for connection with a source of pressure and connected with said sensitive means for actuation thereby and with said control means for operating the latter.

7. In a temperature regulating apparatus, the combination with a vulcanizer comprising a container and a perforate platen therein, of a pair of conduits for supplying heating medium to said shell, one having a relatively small discharge orifice arranged for discharging said medium at a relatively high velocity transversely of said shell between an end of the latter and said platen, a pressure operated control valve for each of said conduits, said valve for said high velocity conduit being arranged for closing by a different pressure corresponding to a higher temperature of said shell, sensitive means connected with and responsive to the temperature in said shell, and a regulating device adapted for connection with a source of pressure and connected with said sensitive means for actuation thereby and with said control valves for operating the latter.

SAMUEL S. AMDURSKY.